(12) United States Patent
Li et al.

(10) Patent No.: US 8,259,749 B2
(45) Date of Patent: Sep. 4, 2012

(54) SYSTEM, METHOD AND APPARATUS OF TIME INFORMATION SYNCHRONIZATION

(75) Inventors: Jiang Li, Shenzhen (CN); Zhan Zhang, Shenzhen (CN); Ning Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 270 days.

(21) Appl. No.: 12/632,594

(22) Filed: Dec. 7, 2009

(65) Prior Publication Data

US 2010/0080249 A1    Apr. 1, 2010

Related U.S. Application Data

(63) Continuation of application No. PCT/CN2008/073185, filed on Nov. 25, 2008.

(30) Foreign Application Priority Data

Nov. 30, 2007 (CN) .......................... 2007 1 0188256

(51) Int. Cl.
*H04J 15/00* (2006.01)

(52) U.S. Cl. ....................................................... 370/464

(58) Field of Classification Search ................... 370/464, 370/503–520; 709/223, 227, 248
See application file for complete search history.

(56) References Cited

U.S. PATENT DOCUMENTS

| | | | | |
|---|---|---|---|---|
| 5,577,075 A | * | 11/1996 | Cotton et al. ................. | 375/356 |
| 6,163,551 A | * | 12/2000 | Wolf .............................. | 370/503 |
| 7,050,450 B1 | * | 5/2006 | Hennen et al. ................ | 370/426 |
| 7,447,931 B1 | * | 11/2008 | Rischar et al. ................ | 713/400 |
| 7,613,212 B1 | * | 11/2009 | Raz et al. ....................... | 370/510 |
| 7,747,725 B2 | * | 6/2010 | Williams et al. .............. | 709/223 |
| 2005/0071703 A1 | * | 3/2005 | Lee et al. ....................... | 713/400 |
| 2007/0064851 A1 | | 3/2007 | Hall, II | |

FOREIGN PATENT DOCUMENTS

| | | |
|---|---|---|
| CN | 1525704 A | 9/2004 |
| CN | 1845546 A | 10/2006 |
| CN | 101009546 A | 8/2007 |
| CN | 101192913 A | 6/2008 |

(Continued)

OTHER PUBLICATIONS

IEEE, 1588 standard for precision clock synchronization protocol, Nov. 2002, pp. 1-154.*

(Continued)

*Primary Examiner* — Dmitry H Levitan
(74) *Attorney, Agent, or Firm* — Leydig, Voit & Mayer, Ltd.

(57) ABSTRACT

A system and a method of time information synchronization as well as related apparatuses are disclosed to improve precision of frequency synchronization or time synchronization. The application port subsystem in the information synchronization system is configured to: generate at least one local clock according to a locally running real-time clock, and provide the local clock for a core subsystem; and the core subsystem is configured to: select a best system clock according to attributes of the clock provided by the application port subsystem, and send the best system clock to the application port subsystem, where: the application port subsystem calibrates the real-time clock according to the best system clock provided by the core subsystem in order to perform frequency synchronization and/or time synchronization. The embodiments of the present invention improve the precision of frequency synchronization or time synchronization effectively.

2 Claims, 14 Drawing Sheets

FOREIGN PATENT DOCUMENTS

| | | |
|---|---|---|
| EP | 0982890 A1 | 3/2000 |
| EP | 1324520 A2 | 7/2003 |
| JP | 2003051831 A | 2/2003 |
| WO | WO 99/11017 | 3/1999 |

OTHER PUBLICATIONS

European Patent Office, Examination Report in European Application No. 08858147.5 (Jan. 20, 2010).

IEEE, "IEEE Standardization for a Precision Clock Synchronization Protocol for Networked Measurement and Control Systems—IEEE Instrumentation and Measurement Society," Sponsored by the Technical Committee on Sensor Technology (TC-9), IEEE Std. 1588™-2008 (Revision of IEEE Std. 1588-2002) (Jul. 24, 2008).

State Intellectual Property Office of the People's Republic of China, English Translation of Written Opinion of the International Searching Authority in International Patent Application No. PCT/CN2008/073185 (Jan. 22, 2009).

1st Office Action from the Chinese Patent Office in corresponding Chinese Patent Application No. 200710188256.X (Jul. 19, 2010).

Written Opinion of the International Searching Authority in corresponding PCT Application No. PCT/CN2008/073185 (Jan. 22, 2009).

International Search Report in corresponding PCT Application No. PCT/CN2008/073185 (Jan. 22, 2009).

$2^{nd}$ Office Action in corresponding European Application No. 08858147.5 (Sep. 23, 2011).

"IEC 61588—Precision clock synchronization protocol for networked measurement and control systems," Sep. 2004, First Edition, Institute of Electrical and Electronic Engineers, New York, New York.

* cited by examiner

SYSTEM, METHOD AND APPARATUS OF TIME INFORMATION SYNCHRONIZATION

CROSS-REFERENCE TO RELATED APPLICATIONS

This application is a continuation of International Application No. PCT/CN2008/073185, filed on Nov. 25, 2008, which claims priority to Chinese Patent Application No. 200710188256.X, filed on Nov. 30, 2007, both of which are hereby incorporated by reference in their entireties.

FIELD OF THE INVENTION

The present invention relates to the communication field, and in particular, to a system and a method and an apparatus of time information synchronization.

BACKGROUND

In the modern communication networks, with the development of data services, some real-time-critical services impose high requirements on frequency synchronization and time synchronization of the whole communication network. Frequency synchronization is a foundation of time synchronization. Without frequency synchronization, there is no precisely synchronous step of time or synchronized time.

The IEEE 1588 V2 protocol is a frequency time synchronization protocol, and is a precision clock synchronization protocol standard of the network measurement and control system, briefly known as Precision Time Protocol (PTP). The PTP aims to synchronize the distributed and independent clocks precisely.

As shown in FIG. 1, a time synchronization solution based on the PTP in the prior art is: All functions stipulated by the PTP, for example, timestamp processing, IEEE 1588 packet disassembling, clock time recovery, Best Master Clock (BMC) algorithm, and port state algorithm, are implemented by a dedicated core subsystem in a centralized way. The specific application port subsystems are responsible only for extracting IEEE 1588 packets, for example extracting an IEEE 1588 packet from a service packet, and inserting such packets, for example inserting an IEEE 1588 packet into a service packet. Only the relevant packets stipulated by the PTP are transmitted between an application port subsystem and a core subsystem.

In the foregoing solution, the timestamp processing is centralized in the core subsystem. The delay and jitters of packet transmission between the application port subsystem and the core subsystem may affect the precision of timestamp processing performed by the core subsystem.

Besides, in the foregoing solution, the core subsystem performs all functions stipulated by the PTP. With increase of the ports in the application port subsystems, the workload of the core subsystem may increase massively, thus affecting efficiency of frequency synchronization and time synchronization.

As shown in FIG. 2, another time synchronization solution based on the PTP in the prior art is: Each application port subsystem has complete IEEE 1588 protocol processing modules, including timestamp processing, IEEE 1588 V2 packet identification, extracting and inserting/assembling and disassembling, BMC algorithm and port state determining unit, and clock time recovering module, thus relieving the workload of the core subsystem and avoiding timestamp processing inaccuracy caused by delay and jitters of packet transmission.

However, because each application port subsystem contains complete IEEE 1588 protocol processing modules, the application port subsystems are independent of each other. At the time of selecting a clock source, only the best clock source in the application port subsystem can be selected, and it is impossible to select the best clock source in the whole system, thus affecting precision of frequency synchronization or time synchronization.

SUMMARY

A system, a method and an apparatus of time information synchronization are disclosed in embodiments of the present invention to improve precision of frequency synchronization or time synchronization.

A system for synchronizing time information is disclosed in an embodiment of the present invention. The system includes:

an application port subsystem, configured to generate at least one local clock according to the locally running real-time clock, and provide the local clock for the core subsystem; and a core subsystem, configured to: select a best system clock according to the attributes of the clock provided by the application port subsystem, and send the best system clock to the application port subsystem, where the application port subsystem calibrates the real-time clock according to the best system clock provided by the core subsystem in order to perform frequency synchronization and/or time synchronization.

A core subsystem is disclosed in an embodiment of the present invention. The core subsystem includes:

a selecting unit, configured to select a best system clock according to the attributes of the clock provided by the application port subsystem; and a clock unit, configured to: determine the corresponding application port in the application port subsystem according to the best system clock selected by the selecting unit, receive the second time information and the first time information sent by the application port, perform frequency synchronization and/or time synchronization according to the first time information and the second time information, and send the best system clock and the frame header information to the real-time clock of each application port in the application port subsystem.

An application port subsystem is disclosed in an embodiment of the present invention. The application port subsystem includes at least one application port. The application port includes:

a real-time clock, configured to: generate a clock, receive the best system clock and the frame header information provided by the core subsystem, and calibrate the clock in order to perform frequency synchronization and/or time synchronization with the core subsystem; and a time information processing unit, configured to: add the first time information to the sent time information packet according to the clock generated by the real-time clock, add the first time information to the received time information packet, read the second time information in the received time information packet, and send the first time information added at the time of receiving the time information packet and the read second time information to the core subsystem.

A method for synchronizing time information is disclosed in an embodiment of the present invention. The method includes:

sending the local clock generated by the locally running real-time clock to the core subsystem;

obtaining the best system clock selected by the core subsystem according to the attributes of the local clock; and calibrating the locally running real-time clock according to the best system clock.

In the embodiments of the present invention, each application port in the application port subsystem includes its own real-time clock, without depending on the clock delivered by the core subsystem. At the time of transmitting packets, the application port can determine the time of receiving or sending the packet directly according to the local real-time clock, thus avoiding time information processing inaccuracy caused by delay and jitters of packet transmission, and improving the precision of frequency synchronization or time synchronization.

DETAILED DESCRIPTION

A system and a method of time information synchronization as well as related apparatuses are disclosed in an embodiment of the present invention to improve precision of frequency synchronization or time synchronization.

In the embodiments of the present invention, each application port in the application port subsystem includes its own real-time clock, thus avoiding timestamp processing inaccuracy caused by delay and jitters of packet transmission. Moreover, the application port subsystem may send the selected stratum-1 best clock to the core subsystem, and perform a second filtering to obtain the best system clock for synchronizing, thus improving precision of frequency synchronization or time synchronization.

Figure 1:
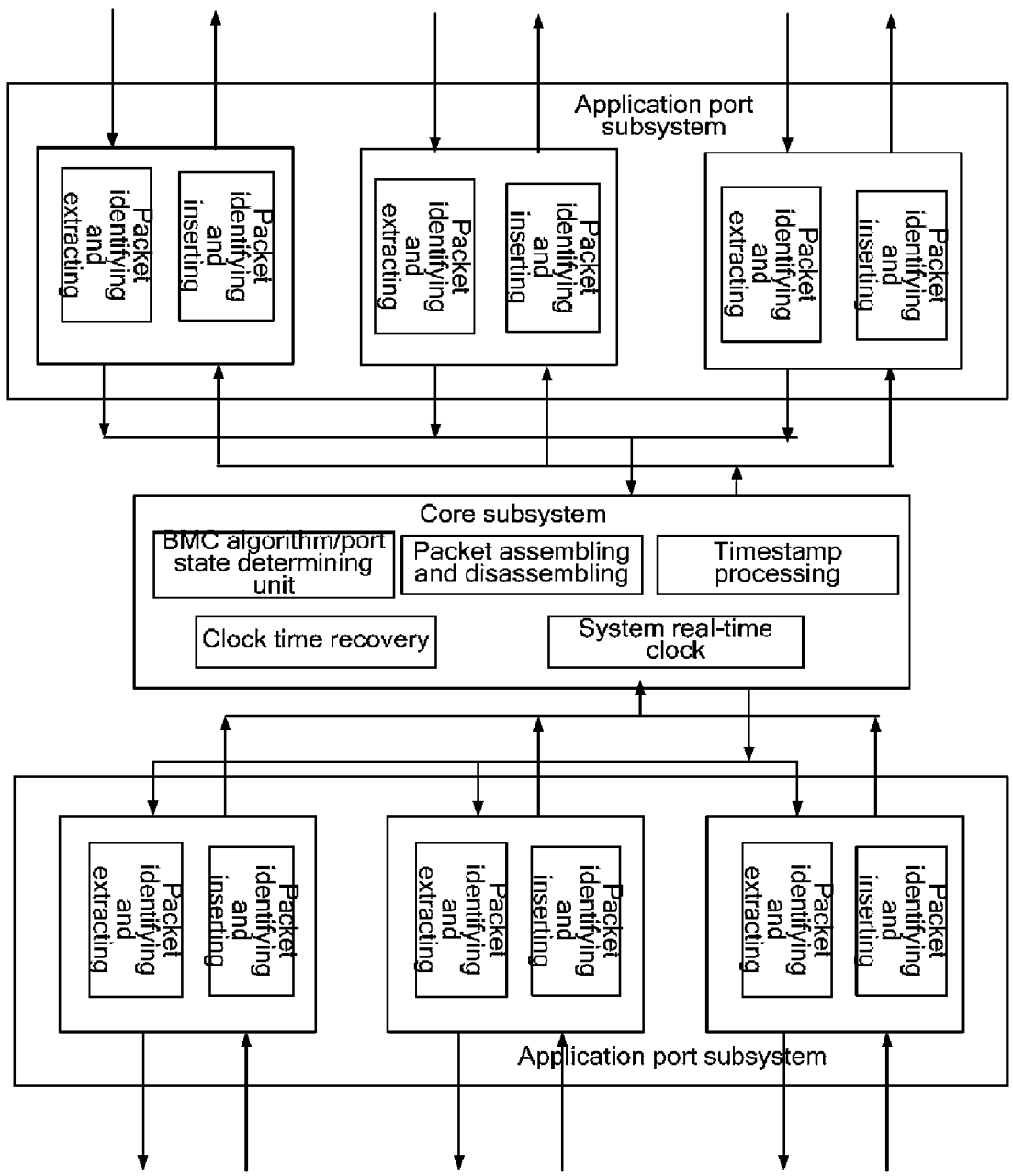
FIG. 1 shows a synchronization solution in the related art.
Figure 1B:
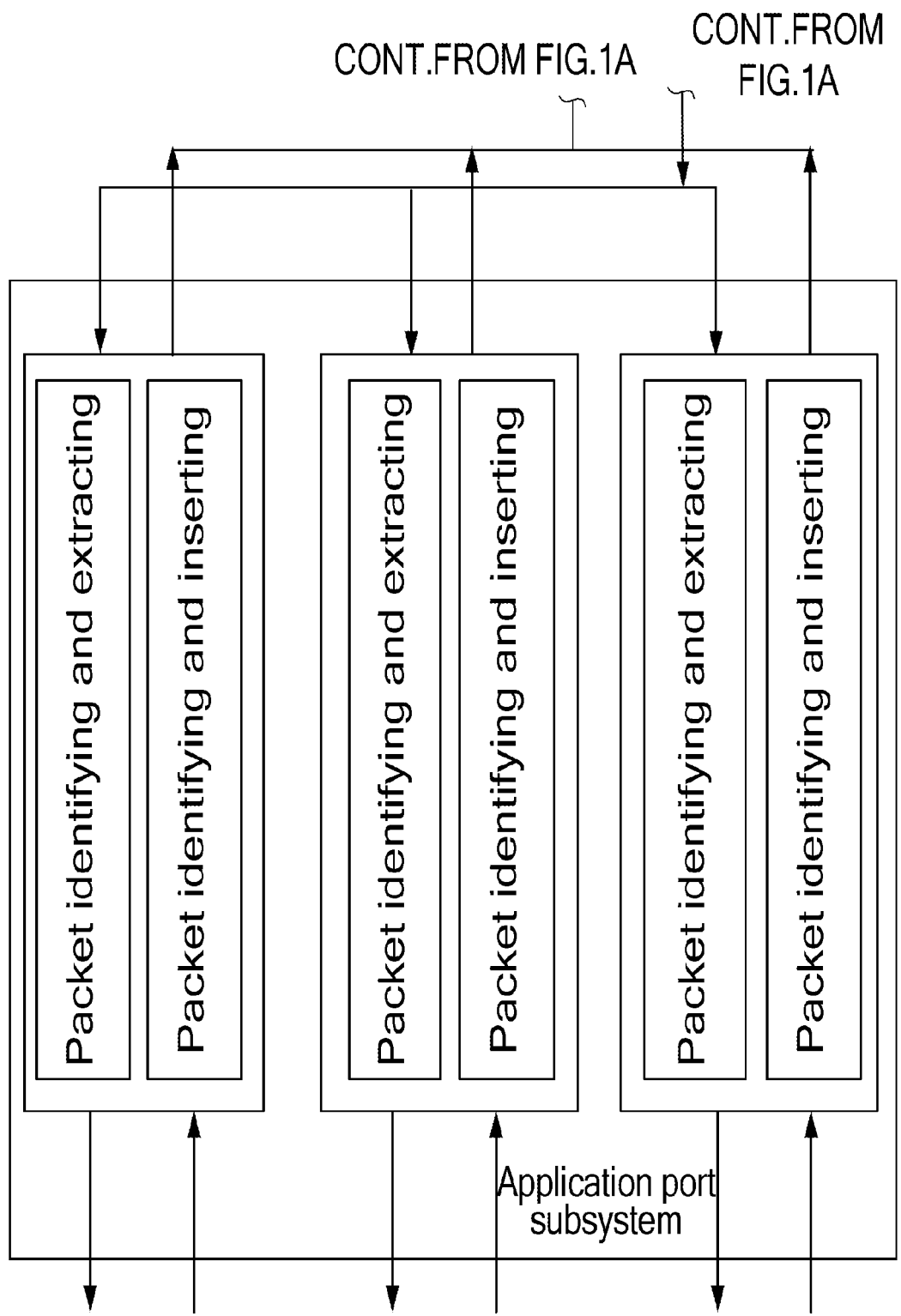
Figure 2:
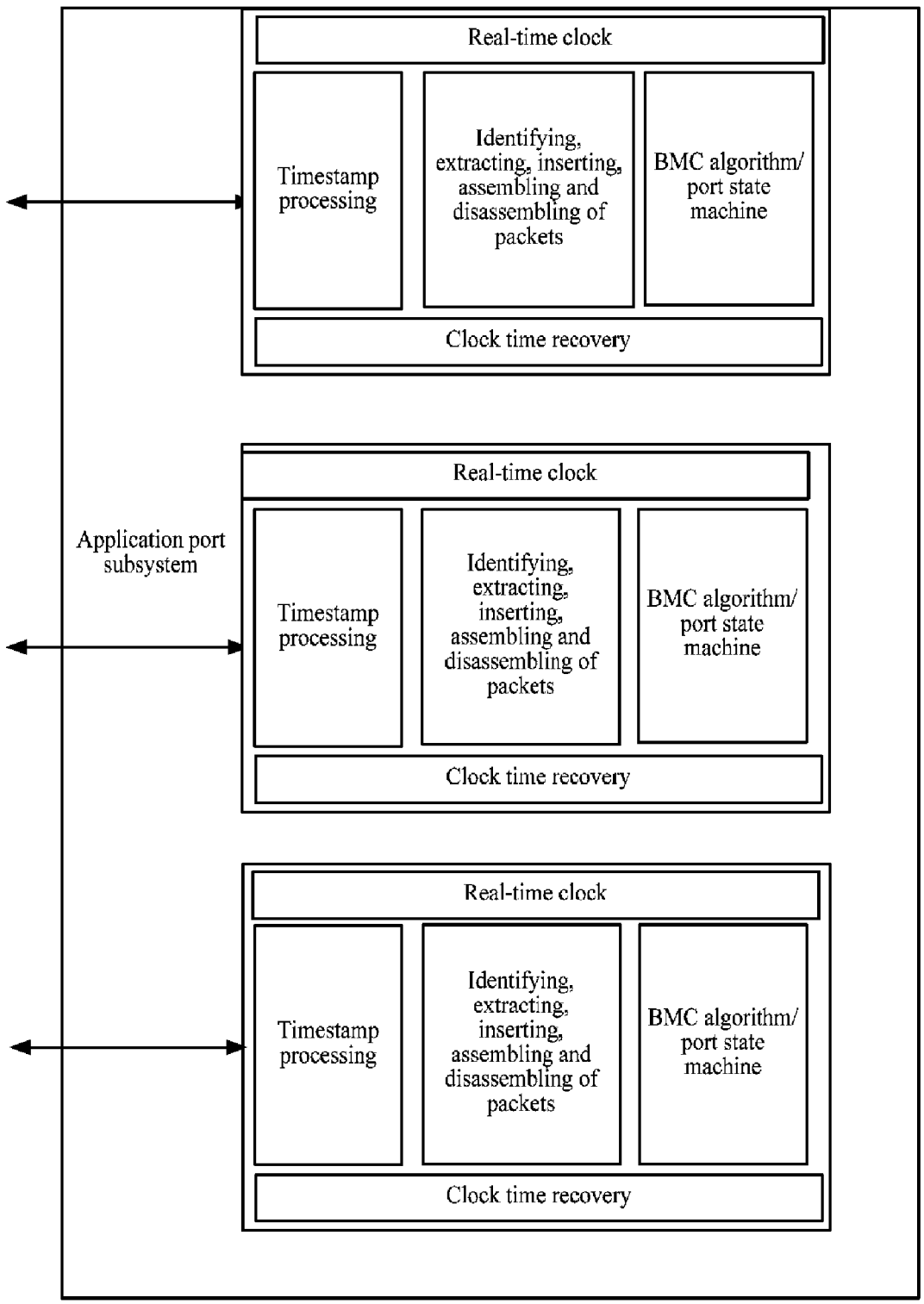
FIG. 2 shows another synchronization solution in the related art.
Figure 3A:
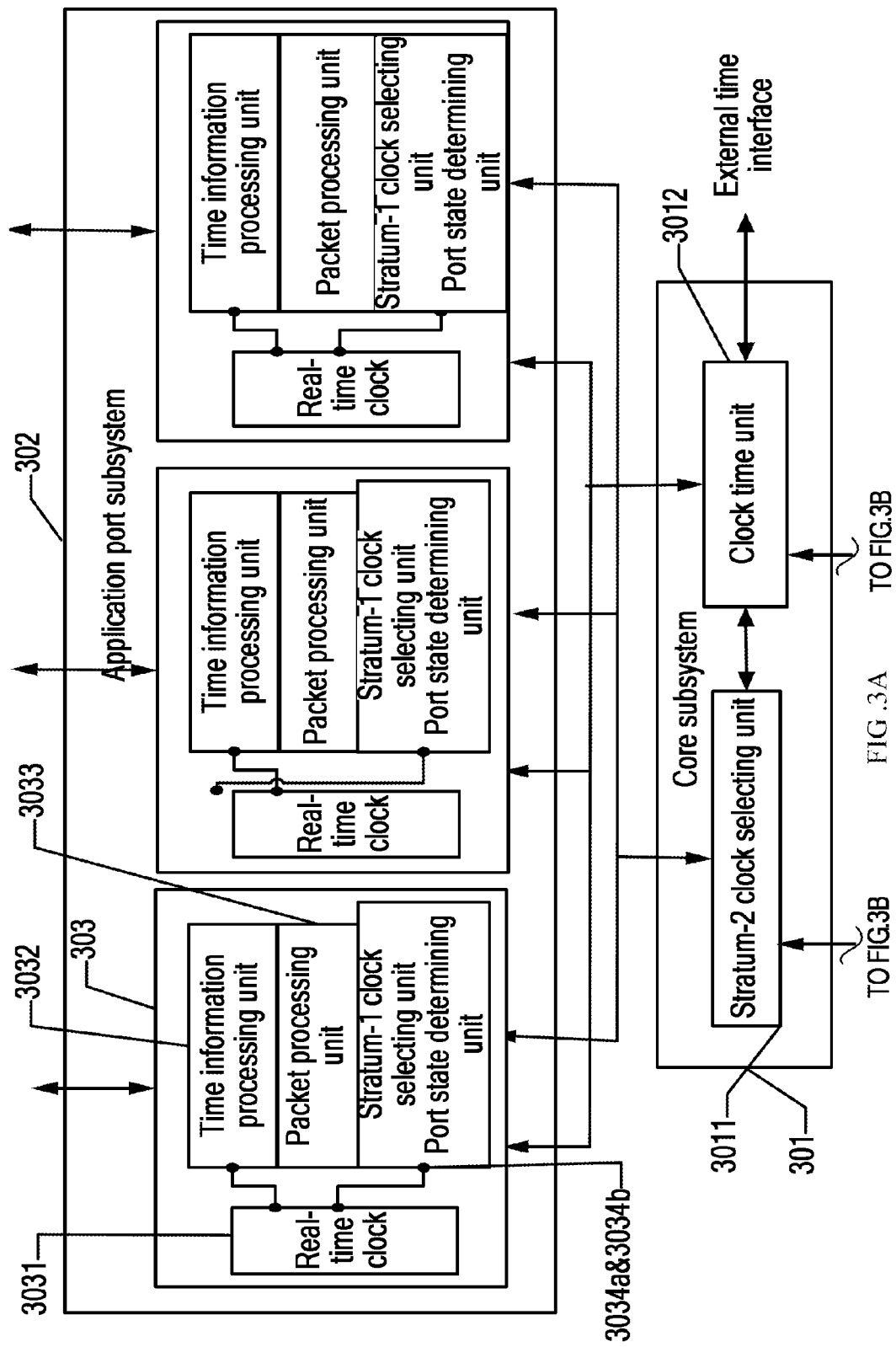
FIG. 3 shows a time information synchronization system in a first embodiment of the present invention.
Figure 3B:
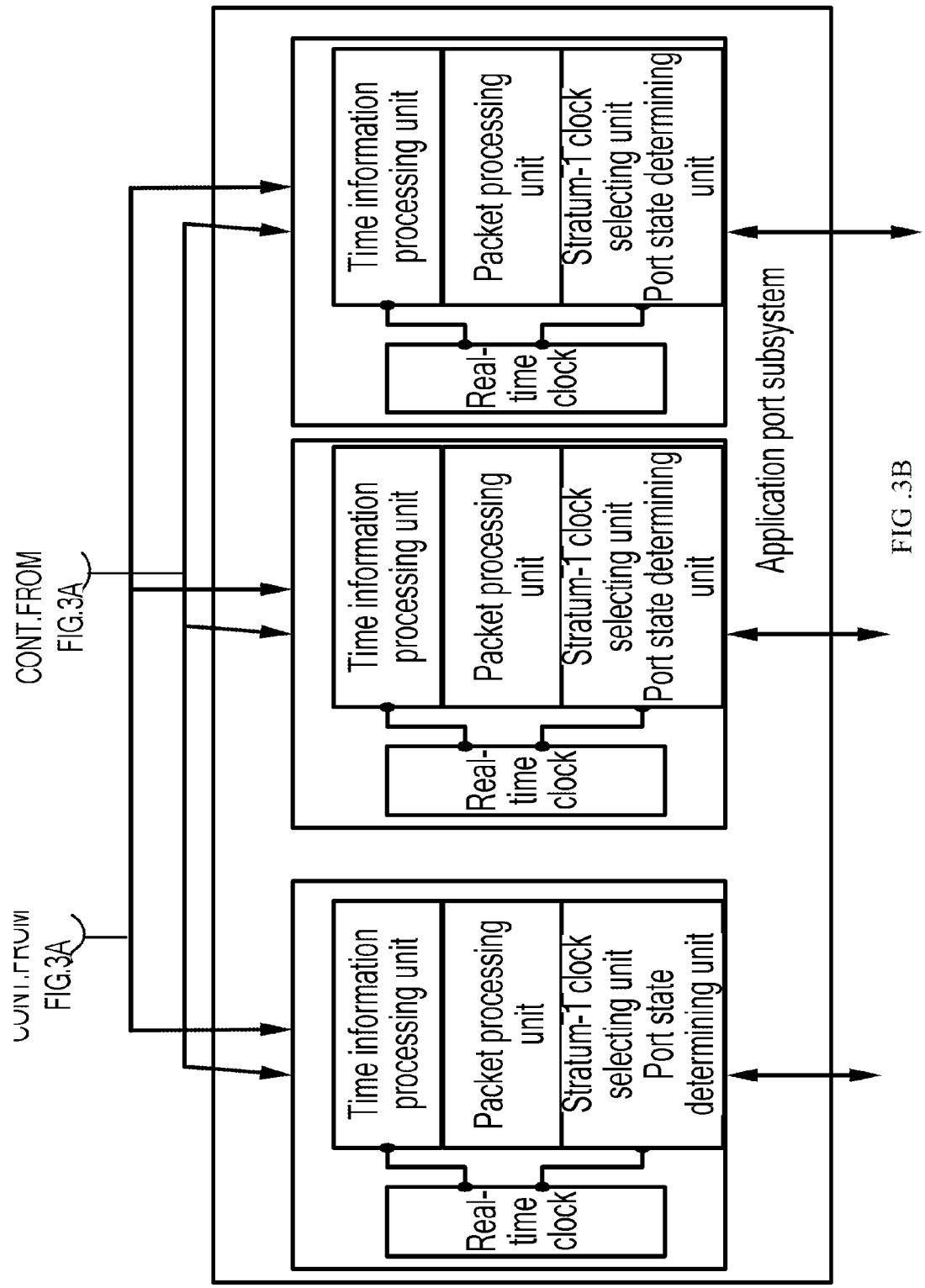

The time information synchronization system under the present invention is detailed below. The time information synchronization system under the present invention falls into two types: a solution that involves selection of a stratum-2 clock, and a solution that involves no selection of a stratum-2 clock. The solution that involves selection of a stratum-2 clock is introduced first hereinafter. As shown in FIG. 3, the time information synchronization system in the first embodiment of the present invention includes:

an application port subsystem 302, configured to generate at least one local clock according to the locally running real-time clock, and select a stratum-1 best clock among the local clocks according to the attributes of the clock; and a core subsystem 301, configured to: select a best system clock according to the attributes of the stratum-1 best clock provided by the application port subsystem 302, and perform frequency synchronization and/or time synchronization according to the best system clock and the time information (including the first time information and the second time information) provided by the application port subsystem 302.

The application port subsystem 302 includes several application ports 303. Each application port 303 includes:

a real-time clock 3031, configured to: generate a clock, and calibrate the clock according to the best system clock and the frame header information provided by the core subsystem 301 in order to perform frequency synchronization and/or time synchronization with the core subsystem 301; and a time information processing unit 3032, configured to: add the first time information to the sent time information packet according to the clock generated by the real-time clock 3031, add the first time information to the received time information packet, read the second time information in the received time information packet, and send the first time information added at the time of receiving the time information packet and the read second time information to the core subsystem 301, where it is understandable that the first time information and the second time information may be sent to the core subsystem 301 in the form of being carried in a time information packet or sent directly.

In this embodiment and the subsequent embodiments, the first time information refers to the time information added by the time information processing unit into the packet according to the current local real-time clock; and the second time information refers to the time information carried in the received packet, and is the time information added into the packet when the sender sends the packet.

In this embodiment, when determining that the application port 303 needs to send a time information packet, the time information processing unit 3032 reads the local time existent at the time of sending the packet in the real-time clock 3031, and adds the first time information into the packet; and, when determining that the application port 303 receives a time information packet, the time information processing unit 3032 reads the time of receiving the packet in the real-time clock 3031, and reads the second time information in the packet.

The packet processing unit 3033 is configured to identify a time information packet, extract the time information packet from a service packet, insert the time information packet into a service packet, and assemble and disassemble the time information packet.

This embodiment supposes that the time information packet is an IEEE 1588 packet. It is understandable that, in practice, the time information packet may be another type of packet.

The stratum-1 clock selecting unit 3034a and the port state determining 3034b use the best clock algorithm to select the best clock of the application port as a stratum-1 best clock, report the stratum-1 best clock to the core subsystem, and determine the state of the current application port according to the best system clock received from the core subsystem 401.

In this embodiment, the stratum-1 clock selecting unit 3034a and the port state determining unit 3034b are integrated together. It is understandable that, in practice, they may be separated.

The core subsystem 301 includes:

a stratum-2 clock selecting unit 3011, configured to select a best system clock through a best clock algorithm according to the attributes of the stratum-1 best clock provided by the application port subsystem 302; and a clock unit 3012, configured to: determine the corresponding application port in the application port subsystem 302 according to the best system clock selected by the stratum-2 clock selecting unit 3011, receive the first time information and the second time information sent by the application port, perform frequency synchronization and/or time synchronization according to the first time information and the second time information, and send the best system clock and the frame header information to the real-time clock 3031 of each application port 303 in the application port subsystem 302.

In this embodiment, the clock unit 3012 determines the corresponding application port according to the best system clock, and then sets the state of the application port to "sending time information packet" in the port state determining unit 3034*b* of the application port subsystem. The state of other ports is "not sending packets". Therefore, the first time information and the second time information are read from this port, and synchronization is performed according to the first time information and the second time information.

It is understandable that, in this embodiment and subsequent embodiments, the clock unit may either receive a time information packet inclusive of the first time information and the second time information from this port or receive another type of packet. In order to make the description brief, in the subsequent embodiments, it is assumed that the clock unit receives a time information packet from the port, and reads the first time information and the second time information from the packet.

The process of selecting the best clock according to the clock attributes in this embodiment is the same as the counterpart process in the prior art, and is not repeated here any further.

The foregoing solution is detailed below.

The technical solution under the present invention is composed of two subsystems: an application port subsystem 302, and an IEEE 1588 V2 core subsystem 301. The application port subsystem 302 is composed of various port 1588 processing modules. The IEEE 1588 V2 core subsystem 301 is composed of a BMC algorithm and control module and a clock time module.

The application port subsystem 302 is an IEEE 1588 processing module of common ports ("ports" mentioned here refer to types of ports rather than quantity of ports), including but not limited to Ethernet ports (including layer-1 protocol packets and layer-2 protocol packets), SDH ports (including STM-N frame), and PDH ports (including E1 and E3).

Each application port is responsible for processing IEEE 1588 timestamps, running the port state determining unit 3034*b*, identifying the IEEE 1588 packet, extracting and inserting packets (extracting an IEEE 1588 packet from a service packet, and inserting an IEEE1588 packet into a service packet), assembling and disassembling packets, calculating out the best clock of the application port according to the BMC algorithm (the Erbest clock serves as a stratum-1 best clock), and running the local real-time clock module.

The IEEE 1588 V2 core subsystem 301 is composed of a BMC algorithm and control module, and a clock time module.

The BMC algorithm and control module runs the dataset comparison algorithm and the BMC algorithm according to the Erbest clock and its parameters sent by the application subsystem to calculate out the Ebest of the whole system, namely, the best system clock, and sends the Ebest to all the application ports and clock units in the application port subsystem 302. The clock unit recovers clock time of the tracked source according to the Ebest clock source sent by the BMC algorithm and control module, and runs the system real-time clock module.

The interfaces between the foregoing two subsystems for implementing data communication are described below:

A. The interface between the application port subsystem 302 and the clock unit 3012 serves the following purposes:

The clock unit 3012 obtains timestamp information from the application port subsystem 302 for recovering the clock time.

The timestamp information described in this embodiment includes: the second time information obtained by the time information processing unit 3032 from the information packet, and the first time information added by the time information processing unit 3032 at the time of receiving the packet. It is understandable that the timestamp information in the subsequent embodiments still bears this meaning In this embodiment, recovering clock time is a process of synchronizing time information. That is, time information is synchronized by recovering the clock time. It is understandable that "recovering clock time" in the subsequent embodiments still bears this meaning The clock unit 3012 provides clocks for the application port subsystem 302 in order to run the real-time clock 3031 of each application port in the application port subsystem 302.

The clock unit 3012 provides the best system clock for the application port subsystem 302, and calibrates the time (including frame header information and the time information represented by the frame header) of the real-time clock 3031 of the application port subsystem 302.

B. The interface between the application port subsystem 302 and the BMC algorithm and control module serves the following purposes:

The application port subsystem 302 reports the dataset of the Erbest clock to the BMC algorithm and control module.

The BMC algorithm and control module reports the dataset of the Ebest clock to the application port subsystem 302.

The BMC algorithm and control module sets various datasets as required for the application port subsystem 302.

The application port subsystem 302 reports its IEEE 1588 module running state to the BMC algorithm and control module.

C. The interface between the BMC algorithm and control module and the clock unit 3012 serves the following purposes:

The BMC algorithm and control module reports the port selected as Ebest clock to the clock unit 3012. According to the reported information, the clock unit 3012 reads timestamp information from a specific port of the application port subsystem 302.

The clock unit 3012 reports its running state to the BMC algorithm and control module.

D. The external time interface of the clock unit 3012 serves the following purposes:

The outside provides time information for the system, or the system provides time information for the outside directly, including frame header information and the time information represented by the frame header.

The mode of implementing the foregoing systems is described below:

IEEE 1588 V2 core subsystem 301: The BMC algorithm and control module is implemented by the CPU; the clock unit is implemented by a dedicated chip; and the second frame header of the external time interface is connected with the outside through a TTL level interface. The time information interface is implemented by an RS232 interface.

Application port subsystem 302: The IEEE 1588 port processing module (implemented through a dedicated chip) is responsible for: processing the IEEE 1588 timestamp, running the port state determining unit 3034*b*, identifying the IEEE 1588 packet, extracting/inserting packets (extracting an IEEE 1588 packet from a service packet, and inserting an IEEE 1588 packet into a service packet), assembling and disassembling packets, and running the local real-time clock module. The CPU of the application port is responsible for: calculating out the best clock (Erbest clock) of the application mode through a BMC algorithm, running the port state determining unit, and controlling the IEEE port processing module through a CPU interface.

The system CPU communicates with the application port CPU through an Ethernet interface:

Interface between the clock unit 3012 and the IEEE 1588 port processing module: Timestamp information and time information may be handled by an IIC interface. Each application port occupies a complete IIC interface. The clock is interfaced with the second frame header through a TTL level interface.

The functions of the port state determining unit 3034b may also be integrated into the IEEE 1588 port processing module. The clock unit 3012 may be implemented through a stand-alone chip instead. The system CPU may communicate with the application port CPU through a CPU interface instead. The interface between the clock unit 3012 and the IEEE 1588 port processing module may be another dedicated hardware interface such as SPI interface. Other specific interfaces may be replaced by a different type of interface as required, as not limited herein.

In the foregoing embodiment and the subsequent embodiments, the process of selecting the best clock is based on the prior art. Specifically, the best clock may be selected through a best clock selection algorithm according to the attributes of the clock to be selected (for example, clock stratum information, or IEEE 1588 clock ID, or clock check difference information), and is not detailed here any further.

Figure 4A:
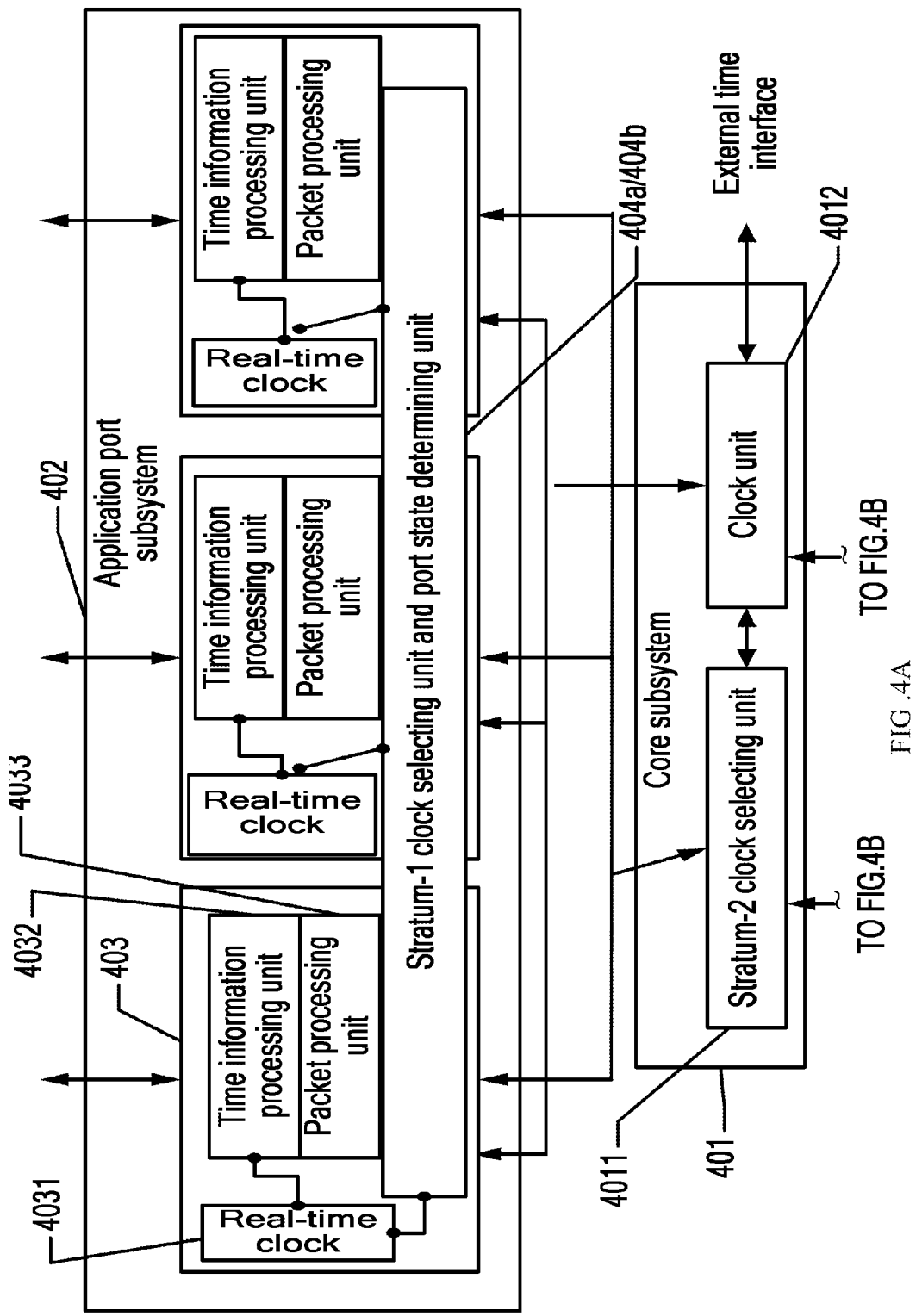
FIG. 4 shows a time information synchronization system in a second embodiment of the present invention.
Figure 4B:
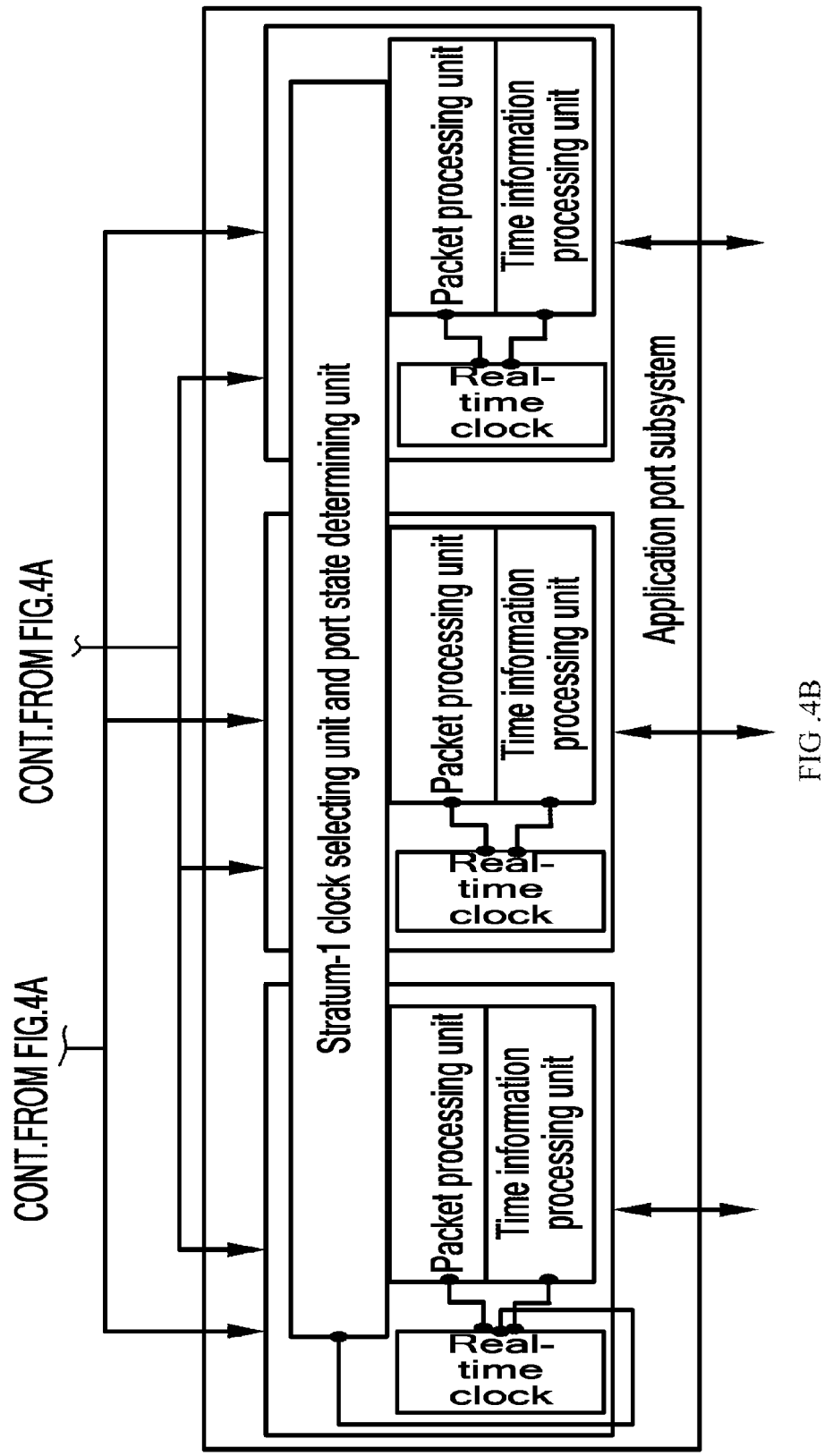

In the foregoing embodiment, each application port in the application port subsystem has its own stratum-1 clock selecting unit and port state determining unit. It is understandable that each application port in an application port subsystem may use the same stratum-1 clock selecting unit and the same port state determining unit. As shown in FIG. 4, the time information synchronization system in the second embodiment of the present invention includes:

an application port subsystem 402, configured to: generate at least one local clock according to the locally running real-time clock, and select a stratum-1 best clock among the local clocks according to the attributes of the clock; and a core subsystem 401, configured to: select a best system clock according to the attributes of the stratum-1 best clock provided by the application port subsystem 402, and perform frequency synchronization and/or time synchronization according to the best system clock and the time information (including the first time information and the second time information) provided by the application port subsystem 402.

The application port subsystem 402 further include several application ports 403, stratum-1 clock selecting units 404a, and port state determining units 404b. The stratum-1 clock selecting unit 404a and the port state determining unit 404b use the best clock algorithm to select the best clock of the application port as a stratum-1 best clock according to the clock generated by the real-time clock, and determine the state of the current application port according to the best system clock received from the core subsystem 401. The application port 403 further includes:

a real-time clock 4031, configured to: generate a clock, and calibrate the clock according to the best system clock and the frame header information provided by the core subsystem 401 in order to perform frequency synchronization and/or time synchronization with the core subsystem 401; and a time information processing unit 4032, configured to: add the first time information to the sent time information packet according to the clock generated by the real-time clock 4031, add the first time information to the received time information packet, read the second time information in the received time information packet, and send the first time information added at the time of receiving the time information packet and the read second time information to the core subsystem 401, where it is understandable that the first time information and the second time information may be sent to the core subsystem 401 in the form of being carried in a time information packet or sent directly.

In this embodiment, when determining that the application port 403 needs to send a time information packet, the time information processing unit 4032 reads the local time existent at the time of sending the packet in the real-time clock 4031, and adds the first time information into the packet; and, when determining that the application port 403 receives a time information packet, the time information processing unit 4032 reads the time of receiving the packet in the real-time clock 4031, and reads the second time information in the packet.

The packet processing unit 4033 is configured to: identify a time information packet, extract the time information packet from a service packet, insert the time information packet into a service packet, and assemble and disassemble the time information packet.

This embodiment supposes that the time information packet is an IEEE 1588 packet. It is understandable that, in practice, the time information packet may be another type of packet.

In this embodiment, the stratum-1 clock selecting unit 404a and the port state determining unit 404b are integrated together. It is understandable that, in practice, they may be separated.

The core subsystem 401 includes:

a stratum-2 clock selecting unit 4011, configured to select a best system clock through a best clock algorithm according to the attributes of the stratum-1 best clock provided by the application port subsystem 402; and a clock unit 4012, configured to: determine the corresponding application port in the application port subsystem 402 according to the best system clock selected by the stratum-2 clock selecting unit 4011, receive the time information packet sent by the application port, read the first time information and the second time information in the packet, perform frequency synchronization and/or time synchronization according to the first time information and the second time information, and send the best system clock and the frame header information to the real-time clock 4031 of each application port 403 in the application port subsystem 402.

In this embodiment, the clock unit 4012 determines the corresponding application port according to the best system clock, and then sets the state of the application port to "sending time information packet" in the port state determining unit 404b of the application port subsystem. The state of other ports is "not sending packets". Therefore, the time information packet inclusive of the first time information and the second time information is read from this port, and synchronization is performed according to the first time information and the second time information.

The communication interfaces between subsystems and the specific implementation of such interfaces in actual application in this embodiment are similar to the counterpart of the foregoing embodiment, and are not repeated here any further.

Described above is a solution that involves selection of a stratum-2 clock. A solution that involves no selection of a stratum-2 clock is introduced below.

Figure 5A:
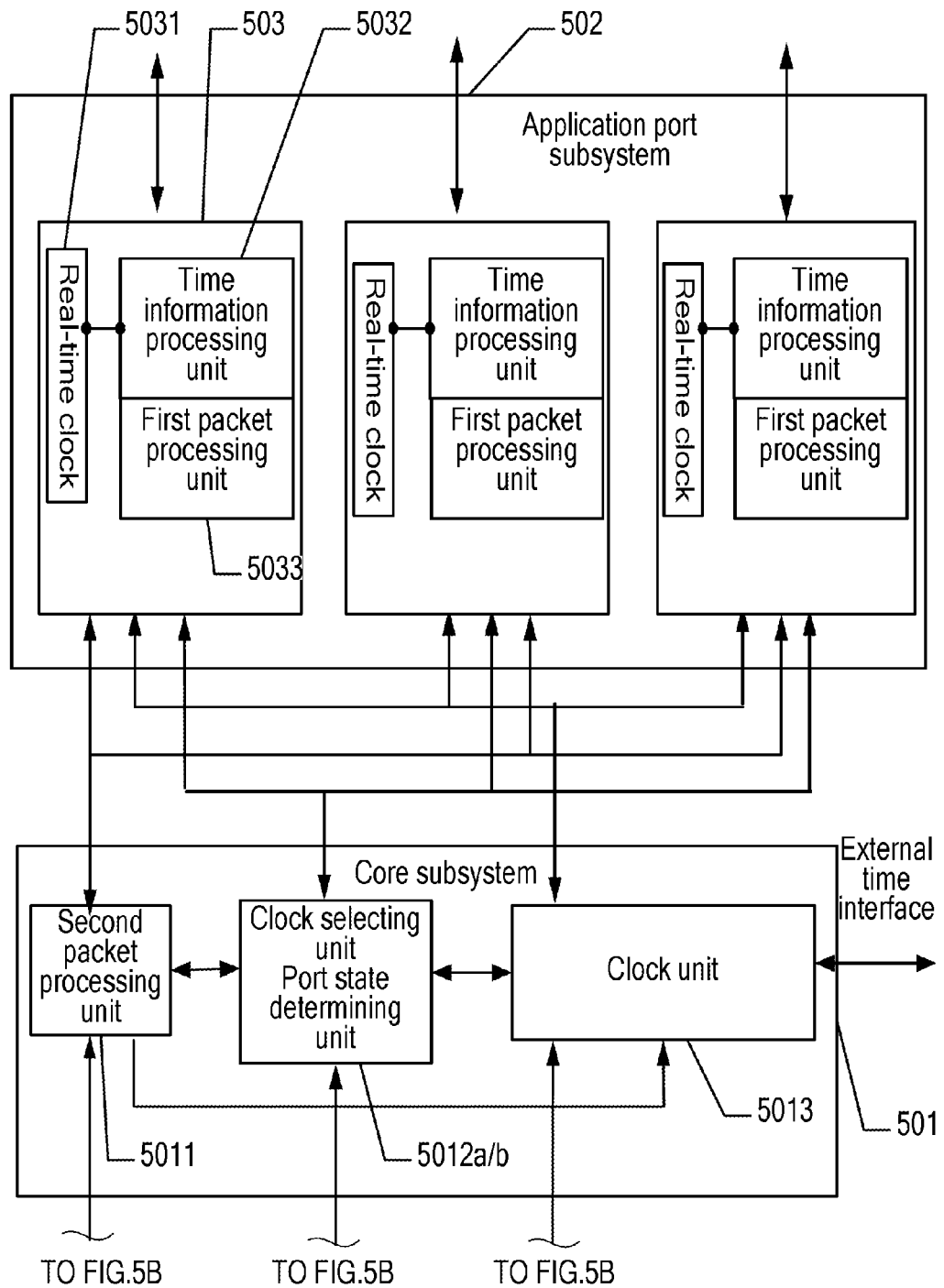
FIG. 5 shows a time information synchronization system in a third embodiment of the present invention.
Figure 5B:
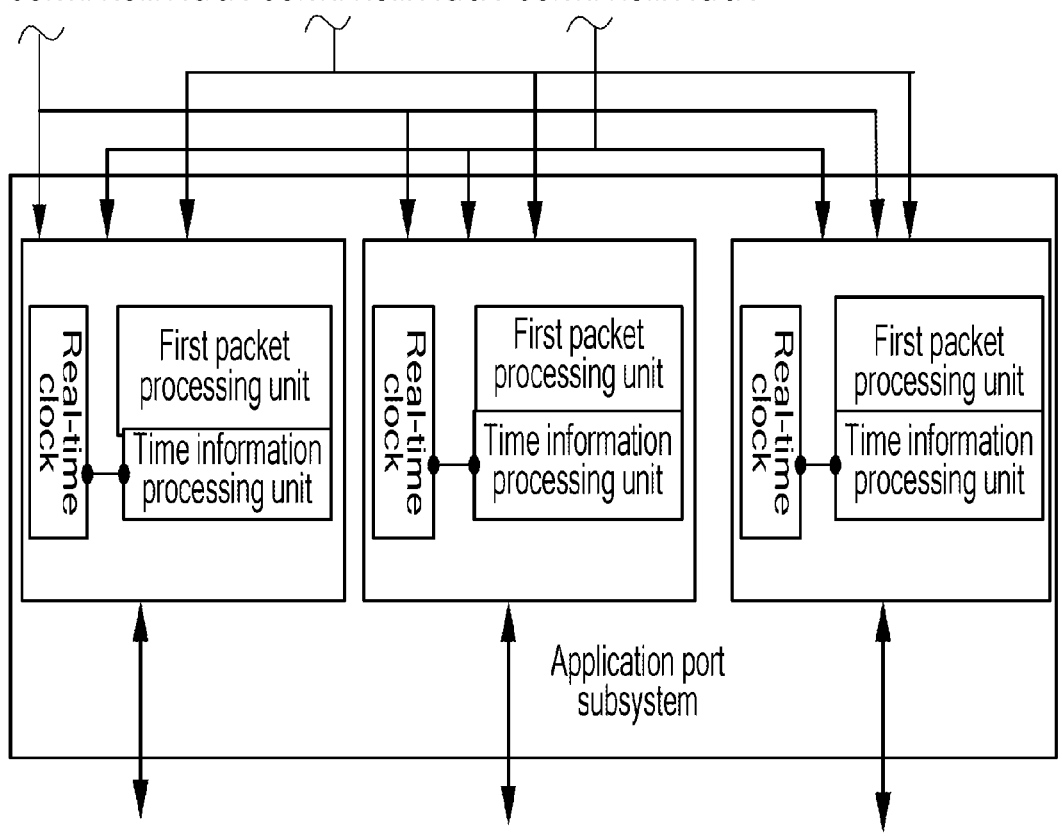

FIG. 5 shows a time information synchronization system in the third embodiment of the present invention. The system includes:

an application port subsystem 502, configured to generate at least one local clock according to the locally running real-time clock; and a core subsystem 501, configured to: select a best system clock according to the attributes of the clock provided by the application port subsystem 502, and perform frequency synchronization and/or time synchronization according to the best system clock and the time information (including the first time information and the second time information) provided by the application port subsystem 502.

The application port subsystem 502 includes several application ports 503. Each application port 503 includes:

a real-time clock 5031, configured to: generate a clock, and calibrate the clock according to the best system clock and the frame header information provided by the core subsystem 501 in order to perform frequency synchronization and/or time synchronization with the core subsystem 501;

a time information processing unit 5032, configured to: add the first time information to the sent time information packet according to the clock generated by the real-time clock 5031, add the first time information to the received time information packet, read the second time information in the received time information packet, and send the first time information added at the time of receiving the time information packet and the read second time information to the core subsystem 501, where it is understandable that the first time information and the second time information may be sent to the core subsystem 501 in the form of being carried in a time information packet or sent directly;

the detailed functional process of the time information processing unit 5032 is the same as the counterpart in the preceding embodiments; and a first packet processing unit 5033, configured to: identify a time information packet, extract the time information packet from a service packet, and insert the time information packet into a service packet.

This embodiment supposes that the time information packet is an IEEE 1588 packet. It is understandable that, in practice, the time information packet may be another type of packet.

The core subsystem 501 includes:

a second packet processing unit 5011, configured to assemble and disassemble the time information packet;

a clock selecting unit 5012*a* and a port state determining unit 5012*b*, configured to select a best system clock through a best clock algorithm according to the attributes of the clock provided by the application port subsystem 502, and determine the state of each application port 503 in the application port subsystem 502 according to the best system clock; and a clock unit 5013, configured to: determine the corresponding application port in the application port subsystem 502 according to the best system clock selected by the clock selecting unit 5012, receive the time information packet sent by the application port, read the first time information and the second time information in the packet, perform frequency synchronization and/or time synchronization according to the first time information and the second time information, and send the best system clock and the frame header information to the real-time clock of each application port in the application port subsystem 502.

The detailed functional process of the clock unit 5013 is similar to that of the time information processing unit in the preceding embodiments.

In this embodiment, packet assembling and disassembling, BMC algorithm, and port state determining unit are integrated into the IEEE 1588 V2 core subsystem. In this case, the interface between the application port subsystem 502 and the IEEE 1588 V2 subsystem 501 needs to be adjusted.

An IEEE 1588 V2 packet transmission channel is added between the application port subsystem 502 and the second packet processing unit 5011.

The interface between the application port subsystem 502 and the BMC algorithm and control module serves the following purposes:

The BMC algorithm and control module reports the state of each port to the application port subsystem 502.

The application port subsystem 502 reports its IEEE 1588 module running state to the BMC algorithm and control module.

The interface between the application port subsystem 502 and the clock unit 5013 serves the following purposes:

The clock unit 5013 reads timestamp information from the application port subsystem 502 for recovering the clock time. This step is optional.

The clock unit 5013 provides clocks for the application port subsystem 502 in order to run the real-time clock 5031 of each application port 503 in the application port subsystem 502.

The clock unit 5013 provides time information for the application port subsystem 502, and calibrates the time, including frame header information and the time information represented by the frame header, of the real-time clock 5031 of each application port 503 in the application port subsystem 502.

The interface between the second packet processing unit 5011, the BMC algorithm module, the port state determining unit, and the control module, namely, the clock selecting and port state determining port 5012, serves the following purposes:

The second packet processing unit 5011 provides the dataset of each port for the clock selecting and port state determining unit 5012.

The clock selecting and port state determining unit 5012 sets dataset information for the second packet processing unit 5011 as required.

The interface between the second packet processing unit 5011 and the clock unit 5013 serves the following purposes:

The second packet processing unit 5011 provides timestamp information for the clock unit 5013 to recover clock time.

Figure 6A:
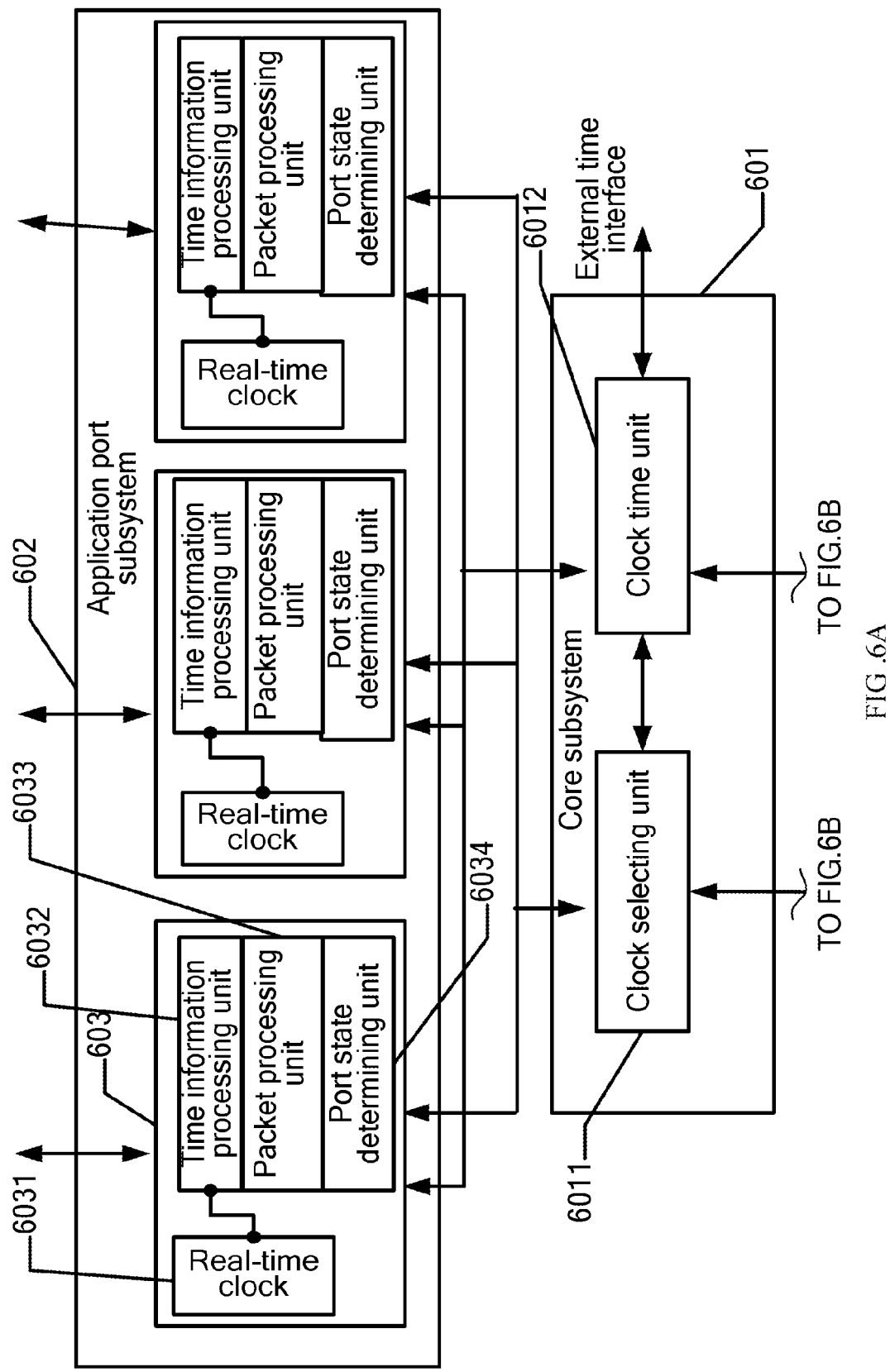
FIG. 6 shows a time information synchronization system in a fourth embodiment of the present invention.
Figure 6B:
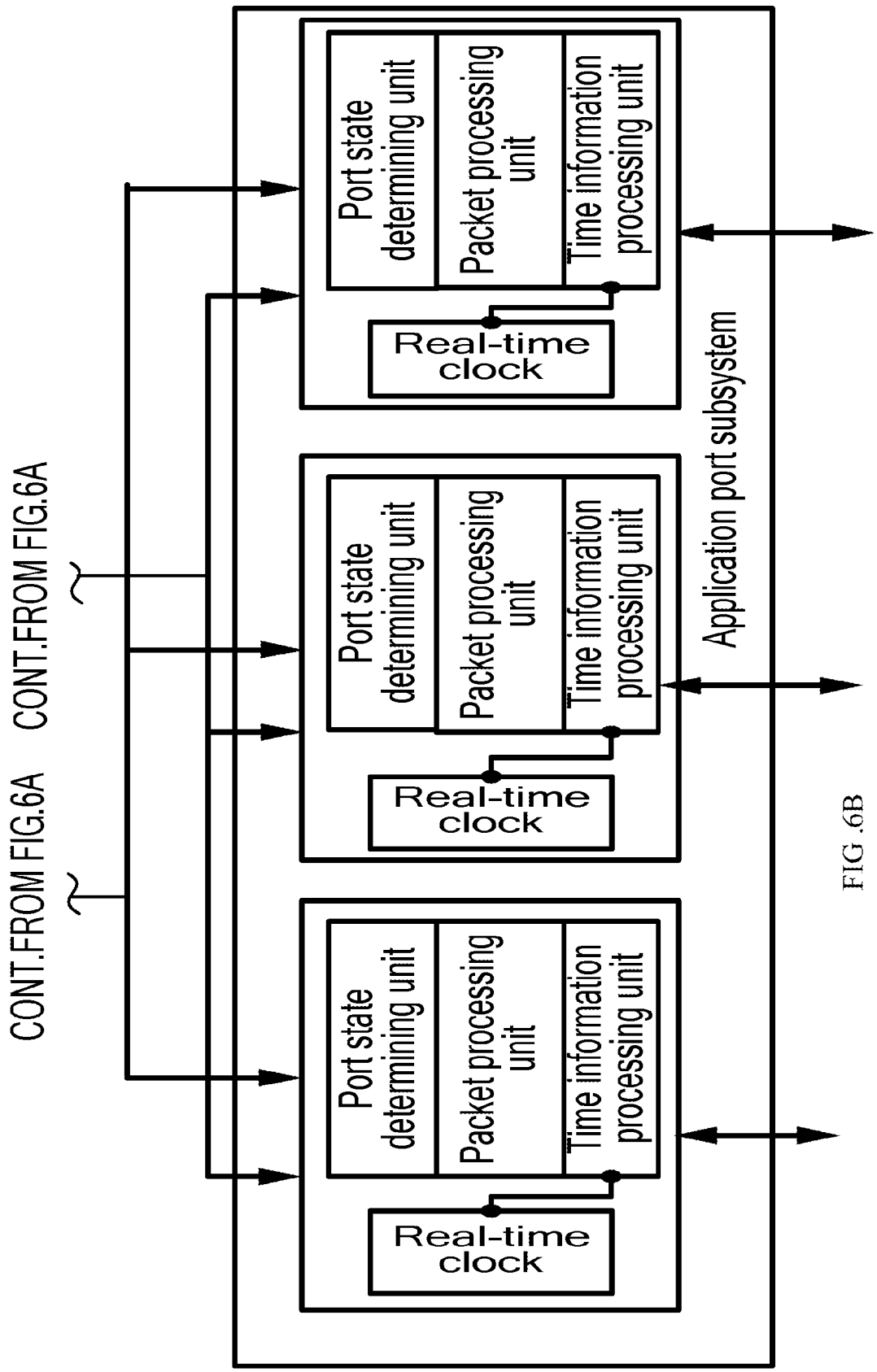

Two other embodiments that involve no stratum-2 clock selection are introduced below. The following embodiments are applicable to the scenario with a moderate number of application ports in the application port subsystem and moderate complexity of subsystems:

FIG. 6 shows a time information synchronization system in the fourth embodiment of the present invention. The system includes:

an application port subsystem 602, configured to: generate at least one local clock according to the locally running real-time clock; and a core subsystem 601, configured to: select a best system clock according to the attributes of the clock provided by the application port subsystem 602, and perform frequency synchronization and/or time synchronization according to the best system clock and the time information (including the first time information and the second time information) provided by the application port subsystem 602.

The application port subsystem 602 includes several application ports 603. Each application port 603 includes:

a real-time clock 6031, configured to: generate a clock, and calibrate the clock according to the best system clock and the frame header information provided by the core subsystem 601 in order to perform frequency synchronization and/or time synchronization with the core subsystem 601;

a time information processing unit 6032, configured to: add the first time information to the sent time information packet according to the clock generated by the real-time clock 6031, add the first time information to the received time information packet, read the second time information in the received time information packet, and send the first time information added at the time of receiving the time information packet and the read second time information to the core subsystem 601, where it is understandable that the first time information and the second time information may be sent to the core subsystem 601 in the form of being carried in a time information packet or sent directly; and a packet processing unit 6033, configured to: identify a time information packet, extract the time information packet from a service packet, and insert the time information packet into a service packet.

This embodiment supposes that the time information packet is an IEEE 1588 packet. It is understandable that, in practice, the time information packet may be another type of packet.

The port state determining unit 6034 is further configured to determine the state of each application port 603 in the application port subsystem 602 according to the best system time provided by the core subsystem 601.

The core subsystem 601 includes:

a clock selecting unit 6011, configured to select a best system clock through a best clock algorithm according to the attributes of the clock provided by the application port subsystem 602; and a clock unit 6012, configured to: determine the corresponding application port in the application port subsystem 602 according to the best system clock selected by the clock selecting unit 6011, receive the time information packet sent by the application port, read the first time information and the second time information in the packet, perform frequency synchronization and/or time synchronization according to the first time information and the second time information, and send the best system clock and the frame header information to the real-time clock of each application port in the application port subsystem 602.

In this embodiment, the clock selecting unit is included only in the core subsystem 601. In this case, the information transmitted by the interface between the application port subsystem 602 and the BMC algorithm and control module, namely, a clock selecting unit 6011, changes to the following:

The application port subsystem 602 reports the clock dataset of each IEEE 1588 port to the BMC algorithm and control module; the BMC algorithm and control module reports the Ebest clock information to the application port subsystem 602; the BMC algorithm and control module sets various datasets as required for the application port subsystem 602; and the application port subsystem 602 reports its IEEE 1588 module running state to the BMC algorithm and control module.

Figure 7A:
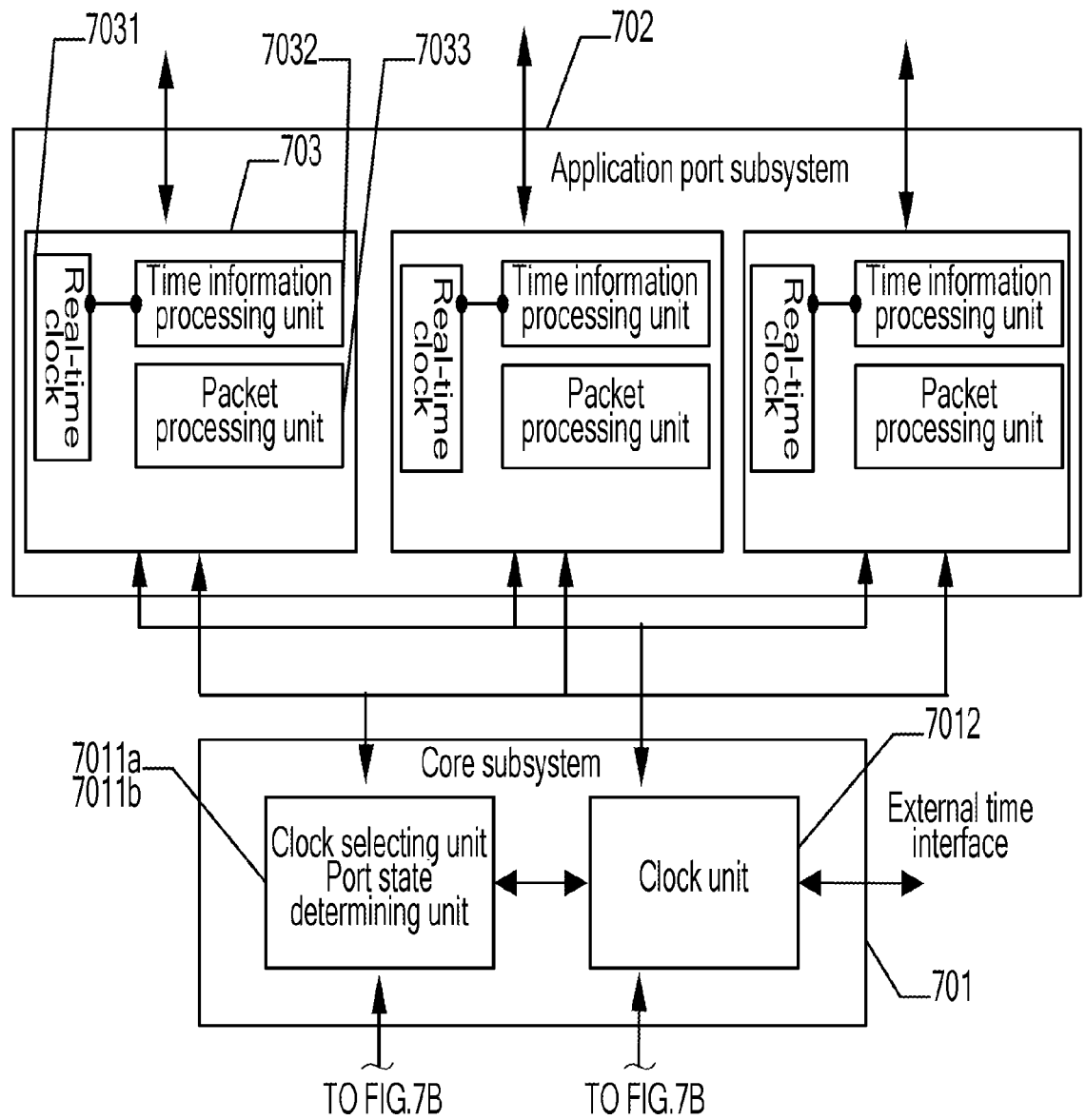
FIG. 7 shows a time information synchronization system in a fifth embodiment of the present invention.
Figure 7B:
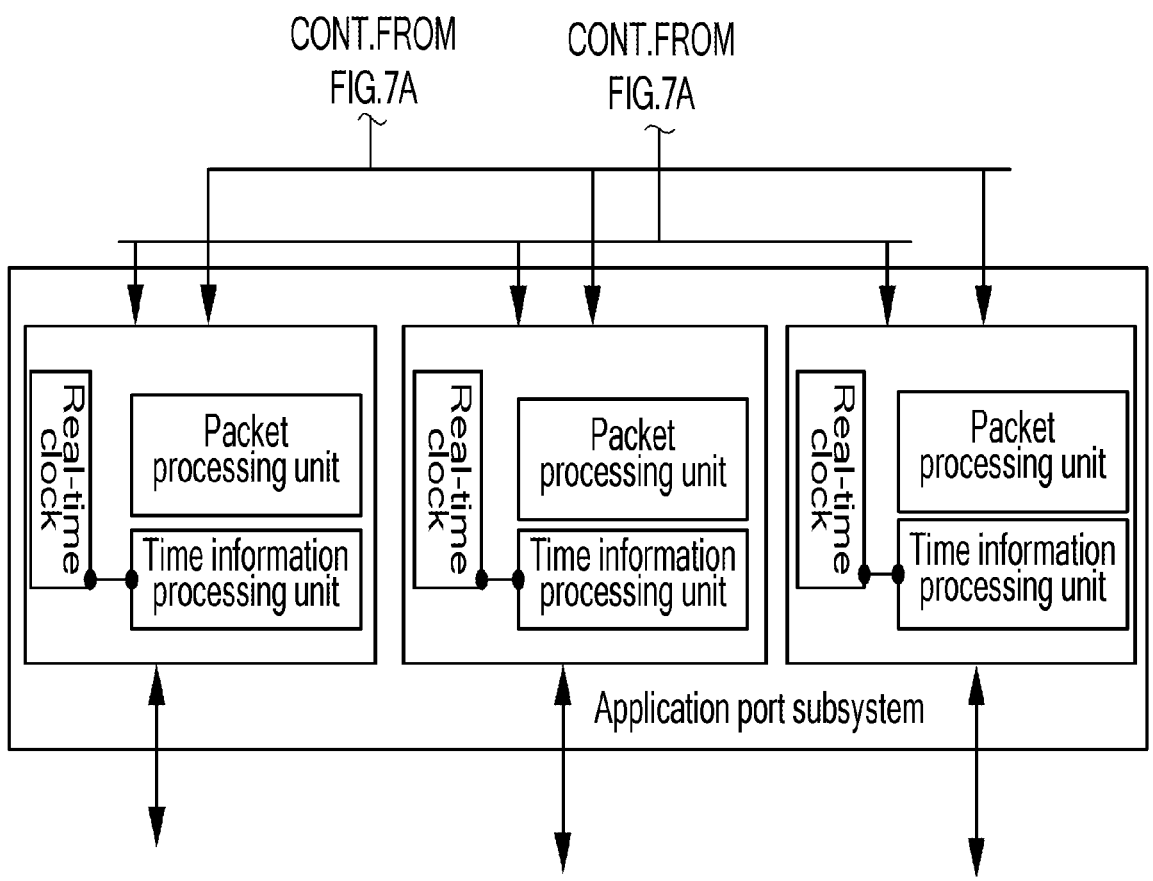

FIG. 7 shows a time information synchronization system in the fifth embodiment of the present invention. The system includes:

an application port subsystem 702, configured to: generate at least one local clock according to the locally running real-time clock; and a core subsystem 701, configured to: select a best system clock according to the attributes of the clock provided by the application port subsystem 702, and perform frequency synchronization and/or time synchronization according to the best system clock and the time information (including the first time information and the second time information) provided by the application port subsystem 702.

The application port subsystem 702 includes several application ports 703. Each application port 703 includes:

a real-time clock 7031, configured to: generate a clock, and calibrate the clock according to the best system clock and the frame header information provided by the core subsystem 701 in order to perform frequency synchronization and/or time synchronization with the core subsystem 701;

a time information processing unit 7032, configured to: add the first time information to the sent time information packet according to the clock generated by the real-time clock 7031, add the first time information to the received time information packet, read the second time information in the received time information packet, and send the first time information added at the time of receiving the time information packet and the read second time information to the core subsystem 701, where it is understandable that the first time information and the second time information may be sent to the core subsystem 701 in the form of being carried in a time information packet or sent directly; and a packet processing unit 7033, configured to: identify a time information packet, extract the time information packet from a service packet, and insert the time information packet into a service packet.

This embodiment supposes that the time information packet is an IEEE 1588 packet. It is understandable that, in practice, the time information packet may be another type of packet.

The core subsystem 701 includes:

a clock selecting unit 7011 and a port state determining unit 702, configured to select a best system clock through a best clock algorithm according to the attributes of the clock provided by the application port subsystem 702, and determine the state of each application port 703 in the application port subsystem 702 according to the best system clock; and a clock unit 7012, configured to: determine the corresponding application port in the application port subsystem 702 according to the best system clock selected by the clock selecting unit 7011, receive the time information packet sent by the application port, read the first time information and the second time information in the packet, perform frequency synchronization and/or time synchronization according to the first time information and the second time information, and send the best system clock and the frame header information to the real-time clock of each application port in the application port subsystem 702.

In this embodiment, the clock selecting unit is included only in the core subsystem 701. In this case, the information transmitted by the interface between the application port subsystem 702 and the BMC algorithm, the port state determining unit and the control module (namely, the clock selecting unit 7011*a* and the port state determining unit 7011*b*) changes to the following:

The application port subsystem 702 reports the clock dataset of each IEEE 1588 port to the clock selecting unit 7011*a* and the port state determining unit 7011*b*; the clock selecting unit 7011*a* and the port state determining unit 7011*b* report the state of each port and the Ebest clock datasets to the application port subsystem 702; the clock selecting unit 7011a and the port state determining unit 7011b configure dataset information for the application port subsystem 702 as required; and the application port subsystem 702 reports the running state of its IEEE 1588 module to the clock selecting unit 7011a and the port state determining unit 7011b.

The time information synchronization system is described through the foregoing embodiments. It is thus evident that the time information synchronization system under the present invention provides the following benefits:

First, the application port handles the timestamps and a dedicated hardware interface transmits the timestamp information, thus ensuring accuracy of clock time recovery.

Secondly, the application port subsystem may use different modules, depending on the application port. Nevertheless, the interface connected to the clock unit and the BMC control module is the same, thus improving the extensibility.

Moreover, the centralized control is combined with distributed control. Therefore, the requirements on the functions and performance of the application port subsystem are lowered, and the modules are relatively independent, thus cutting back costs.

Finally, the only subsystem related to the time frequency recovery module throughout the system is the core subsystem, without the need of deploying such a subsystem in each application port subsystem, thus further reducing costs.

Figure 8:
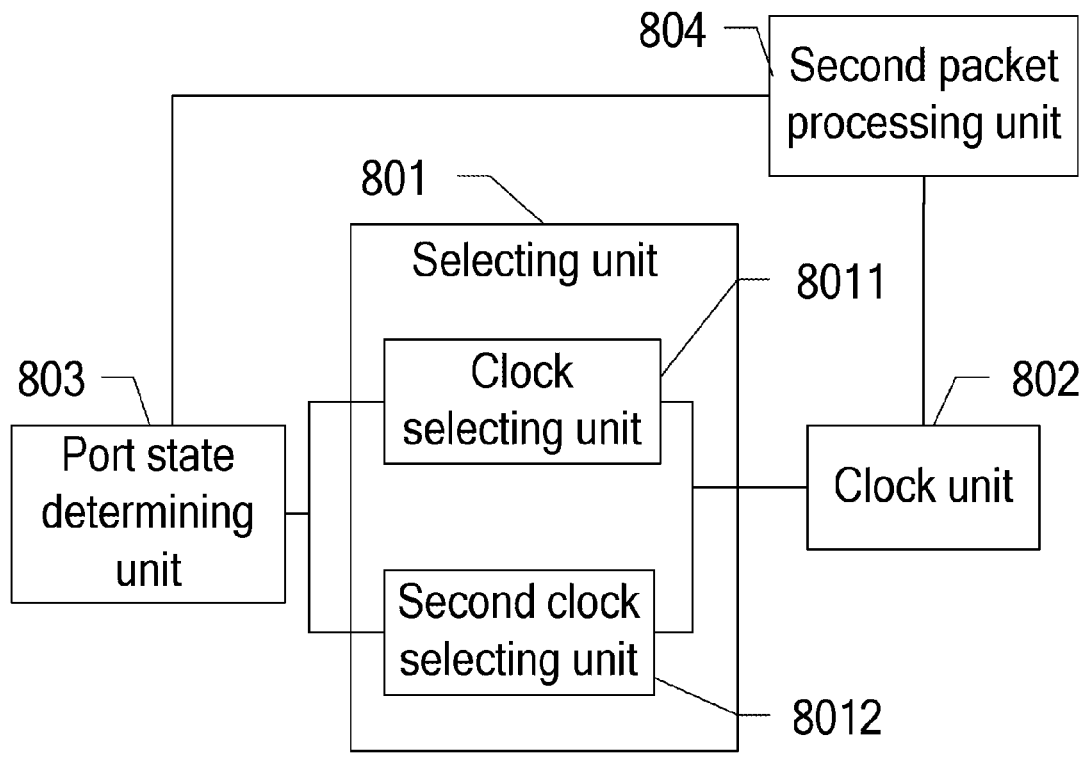
FIG. 8 shows a core subsystem in an embodiment of the present invention.

The core subsystem and the application port subsystem in the foregoing system can exist independently, or are implemented in other similar systems. The core subsystem and the application port subsystem in an embodiment of the present invention are introduced below:

FIG. 8 shows a core subsystem in an embodiment of the present invention. The core subsystem includes:

a selecting unit 801, configured to select a best system clock through a best clock algorithm according to the attributes of the clock provided by the application port subsystem; and a clock unit 802, configured to: determine the corresponding application port in the application port subsystem according to the best system clock selected by the clock selecting unit, receive the time information packet sent by the application port, read the first time information and the second time information in the packet, perform frequency synchronization and/or time synchronization according to the first time information and the second time information, and send the best system clock and the frame header information to the real-time clock of each application port in the application port subsystem.

The selecting unit 801 may be:

a clock selecting unit 8011, configured to select a best system clock through a best clock algorithm according to the attributes of the clock provided by the application port subsystem; or a stratum-2 clock selecting unit 8012, configured to select a best system clock through a best clock algorithm according to the attributes of the stratum-1 best clock provided by the application port subsystem.

The core subsystem in this embodiment further includes a port state determining unit 803, configured to determine the state of the current application port according to the best system clock.

The core subsystem in this embodiment further includes a second packet processing unit 804, configured to assemble and disassemble the time information packet.

Figure 9:
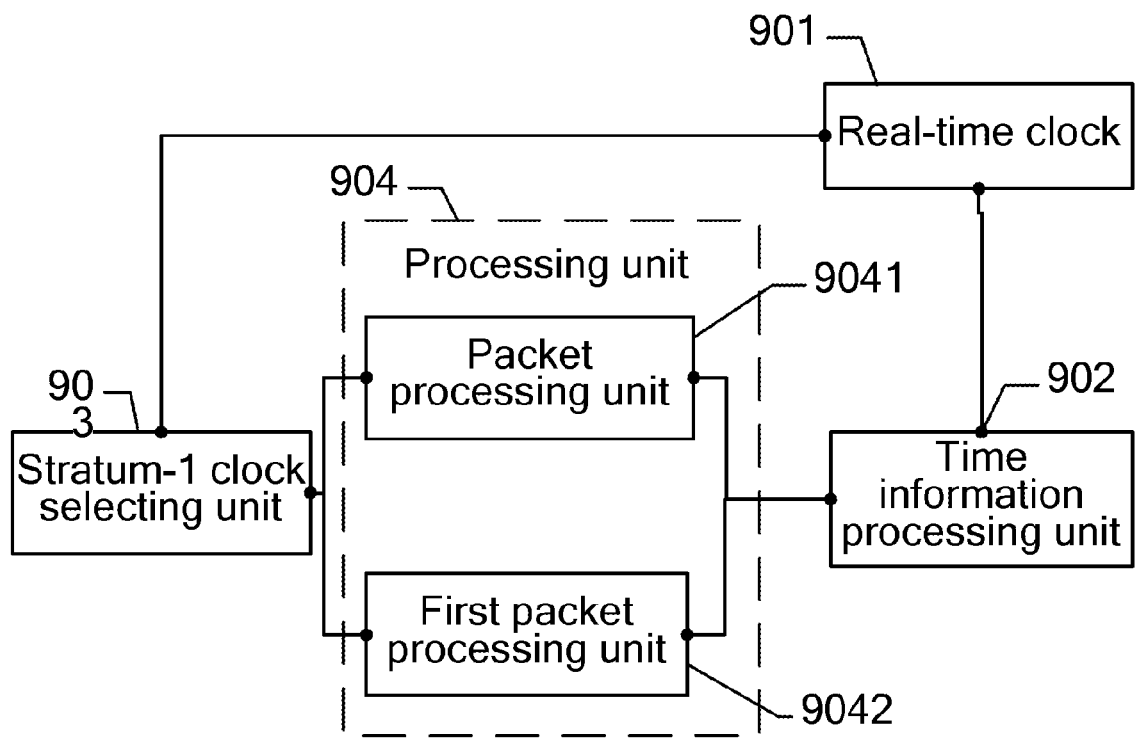
FIG. 9 shows an application port subsystem in an embodiment of the present invention.

As shown in FIG. 9, an application port in an application port subsystem disclosed in an embodiment of the present invention includes:

a real-time clock 901, configured to: generate a clock, and calibrate the clock according to the best system clock and the frame header information provided by the core subsystem in order to perform frequency synchronization and/or time synchronization with the core subsystem; and a time information processing unit 902, configured to: add the first time information to the sent time information packet according to the clock generated by the real-time clock, add the first time information to the received time information packet, read the second time information in the received time information packet, and send the first time information added at the time of receiving the time information packet and the read second time information to the core subsystem, where it is understandable that the first time information and the second time information may be sent to the core subsystem in the form of being carried in a time information packet or sent directly.

The application port in this embodiment further includes: a stratum-1 clock selecting unit 903, configured to: select a best clock of the application port through a best clock algorithm according to the attributes of the clock generated by the real-time clock, and use the selected best clock as stratum-1 best clock and report it to the core subsystem.

The application port in this embodiment further includes a processing unit 904, configured to process packets.

The processing unit 904 in this embodiment may be:

a packet processing unit 9041, configured to: identify a time information packet, extract the time information packet from a service packet, insert the time information packet into a service packet, and assemble and disassemble the time information packet; or a first packet processing unit 9042, configured to: identify a time information packet, extract the time information packet from a service packet, and insert the time information packet into a service packet.

The time information synchronization method in an embodiment of the present invention is detailed below. The method includes the following steps:

S1. The application port subsystem sends the local clock generated by the locally running real-time clock to the core subsystem.

S2. The core subsystem selects a best system clock according to the attributes of the local clock, and sends the best system clock to the application port subsystem.

S3. The application port subsystem calibrates the locally running real-time clock according to the best system clock.

In this embodiment, step S1 includes: The application port subsystem selects a stratum-1 best clock among the local clocks according to the attributes of the local clock, and sends the stratum-1 best clock to the core subsystem.

Accordingly, step S2 includes: The core subsystem selects the best system clock according to the attributes of the stratum-1 best clock provided by the application port subsystem.

The detailed steps and implementation modes of the foregoing method embodiment are elaborated in the preceding apparatus embodiment, and are not repeated here any further.

Detailed above are a system and a method of time information synchronization as well as the related apparatuses in embodiments of the present invention. Although the invention is described through some exemplary embodiments, the invention is not limited to such embodiments. It is apparent that those skilled in the art can make various modifications and variations to the invention without departing from the scope of the invention.

What is claimed is:

1. A time information synchronization system, comprising:

an application port subsystem and a core subsystem, wherein the application port subsystem comprises at least one application port; and the application port comprises:
- a real-time clock, configured to generate a clock and calibrate the generated clock according to a best system clock provided by the core subsystem in order to make the clock perform the frequency synchronization and/or the time synchronization with the core subsystem; and
- a time information processing unit, configured to:
  - add first time information to a sent time information packet according to the clock generated by the real-time clock,
  - add the first time information to a received time information packet,
  - read second time information in the received time information packet, and
  - send the first time information and the read second time information to the core subsystem;
- a stratum-1 clock selecting unit configured to select the best clock among the clocks of the application port as a stratum-1 best clock and report it to the core subsystem;
- a port state determining unit configured to determine a state of a current application port according to the best system clock received from the core subsystem; and
- a packet processing unit, configured to identify a time information packet, extract the time information packet from a service packet, insert the time information packet into the service packet, and assemble and disassemble the time information packet;

wherein the core subsystem comprises:
a stratum-2 clock selecting unit configured to select a best system clock according to attributes of the stratum-1 best clock provided by the application port subsystem; and a clock unit, configured to:
- determine the corresponding application port in the application port subsystem according to the best system clock selected by the stratum-2 clock selecting unit,
- receive the time information packet sent by the application port,
- read the first time information and the second time information in the packet,
- perform the frequency synchronization and/or the time synchronization according to the first time information and the second time information, and
- send the best system clock to the real-time clock of each application port in the application port subsystem.

2. An application port subsystem, comprising at least one application port, wherein the application port includes:
- a real-time clock, configured to generate a clock and receive a best system clock provided by a core subsystem, and
- calibrate the clock in order to perform frequency synchronization and/or time synchronization with the core subsystem; and
- a time information processing unit, configured to:
  - add first time information to a sent time information packet according to the clock generated by the real-time clock,
  - add the first time information to received time information packet,
  - read second time information in the received time information packet, and
  - send the first time information added at time of receiving the time information packet and the read second time information to the core subsystem;

wherein the application port in the application port subsystem further comprises:
- a stratum-1 clock selecting unit, configured to select a best clock of the application port according to attributes of the clock generated by the real-time clock, and use the selected best clock as a stratum-1 best clock and report it to the core subsystem; and
- a packet processing unit, configured to identify a time information packet, extract the time information packet from a service packet, insert the time information packet into the service packet, and assemble and disassemble the time information packet.

* * * * *